US011537449B2

(12) United States Patent
Kuruvilla et al.

(10) Patent No.: US 11,537,449 B2
(45) Date of Patent: *Dec. 27, 2022

(54) DEVICES AND METHODS FOR PROVIDING NOTIFICATIONS

(71) Applicant: The Toronto-Dominion Bank, Toronto (CA)

(72) Inventors: Denny Devasia Kuruvilla, Toronto (CA); Esli Gjini, Etobicoke (CA); Sarah Reeve, Toronto (CA); Matija Bosnjakovic, Oakville (CA); Dagmara Guy, Toronto (CA); Jaspal Singh Samra, Brampton (CA); Abhiney Natarajan, Stoney Creek (CA); Haobin Li, Kitchener (CA); Richard Yu, Mississauga (CA); Md Abdur Razzak Chowdhury, Mississauga (CA); Nolan Glynn-Udrow, Toronto (CA); Kartikay Dani, Brampton (CA); Ryan Wu, Vaughan (CA); Andrey Petrov, Toronto (CA); Peter Horvath, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 281 days.

This patent is subject to a terminal disclaimer.

(21) Appl. No.: 16/941,619

(22) Filed: Jul. 29, 2020

(65) Prior Publication Data
US 2020/0356426 A1 Nov. 12, 2020

Related U.S. Application Data

(63) Continuation of application No. 16/123,290, filed on Sep. 6, 2018, now Pat. No. 10,761,909.

(51) Int. Cl.
G06F 15/163 (2006.01)
G06F 9/54 (2006.01)
(Continued)

(52) U.S. Cl.
CPC ............ *G06F 9/542* (2013.01); *G06F 1/14* (2013.01); *G06F 21/31* (2013.01); *G06Q 40/04* (2013.01)

(58) Field of Classification Search
CPC G06F 9/542; G06F 1/14; G06F 21/31; G06Q 40/04
See application file for complete search history.

(56) References Cited

U.S. PATENT DOCUMENTS 5,787,402 A 7/1998 Potter et al.
9,179,256 B1 11/2015 Pietraniec
(Continued)

OTHER PUBLICATIONS

Jameela Al-Jaroodi et al. "A Flexible Notification System for Stocks Investors" (Year: 2009).*
(Continued)

*Primary Examiner* — Timothy A Mudrick
*Assistant Examiner* — Abdou K Seye
(74) *Attorney, Agent, or Firm* — Rowand LLP

(57) ABSTRACT

Devices and methods for providing alert notifications. The device includes an input module, a display, and memory having instructions. The device receives, via the input module, a first signal representing a command to set an alert condition associated with an identifier and, in response, generates the alert condition. The device transmits a second signal representing the alert condition to a monitoring system for setting up a targeted notification. The device receives a third signal representing an asserted alert indicating that the alert condition is satisfied and displays on the display, based on the third signal representing the asserted alert, an alert notification including the identifier and a first selectable option associated with a first application interface. In response to receiving, via the input module, a fourth signal representing selection of the first selectable option, the
(Continued)

device displays the first application interface and auto-populates a first field based on the identifier.

18 Claims, 11 Drawing Sheets

(51) Int. Cl.
*G06F 21/31* (2013.01)
*G06F 1/14* (2006.01)
*G06Q 40/04* (2012.01)

(56) References Cited

U.S. PATENT DOCUMENTS

| | | | |
|---|---|---|---|
| 9,805,419 B1* | 10/2017 | Weisz | G06Q 40/04 |
| 10,180,862 B1* | 1/2019 | Schleifer | G06F 9/542 |
| 2004/0073660 A1 | 4/2004 | Toomey | |
| 2006/0069635 A1* | 3/2006 | Ram | G06Q 30/08 |
| | | | 705/37 |
| 2010/0088300 A1 | 3/2010 | Gbadegesin et al. | |
| 2010/0293110 A1 | 11/2010 | Rosenthal et al. | |
| 2011/0196774 A1* | 8/2011 | Scianna | G06Q 40/04 |
| | | | 705/37 |
| 2015/0332396 A1 | 11/2015 | Khuntia et al. | |
| 2018/0107816 A1* | 4/2018 | Wu | H04W 12/68 |

OTHER PUBLICATIONS

Jameela Al-Jaroodi et al. "Analysis of Web Alert Models" Aug. 2009.

* cited by examiner

DEVICES AND METHODS FOR PROVIDING NOTIFICATIONS

CROSS REFERENCE TO RELATED APPLICATIONS

The present application is a continuation of U.S. patent application Ser. No. 16/123,290 filed on Sep. 6, 2018, the entirety of which is incorporated herein by reference.

TECHNICAL FIELD

The present application relates to allocating tradable resources and, in particular, to devices and methods for providing notifications for tradable resources.

BACKGROUND

Consumers are provided with a plethora of information via Internet webpages, mobile application software, and other electronic computing medium. Information that is particularly useful for a consumer may be contained within large volumes of dynamically updated data sets, documents, or application screens and may be viewed using electronic computing devices. In response to receiving the data sets, documents, or application screens regarding tradable resources, such as tradable commodities, professional resources, computing resources, or value instruments, among other tradable resources, the consumer can take some action.

Electronic computing devices can, via user interfaces, provide selectable options for receiving action commands from the consumer. While electronic computing devices can display the large volumes of dynamically updated data sets, documents, or application screens, the electronic computing device displays can have physical size limitations, thereby constraining the volume of information or the number of application screens that may be displayed at a particular point in time. Due to the physical size limitations of electronic computing device displays, the consumer may need to advance several display interfaces for consuming information and for accessing selectable options for taking action on tradable resources.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
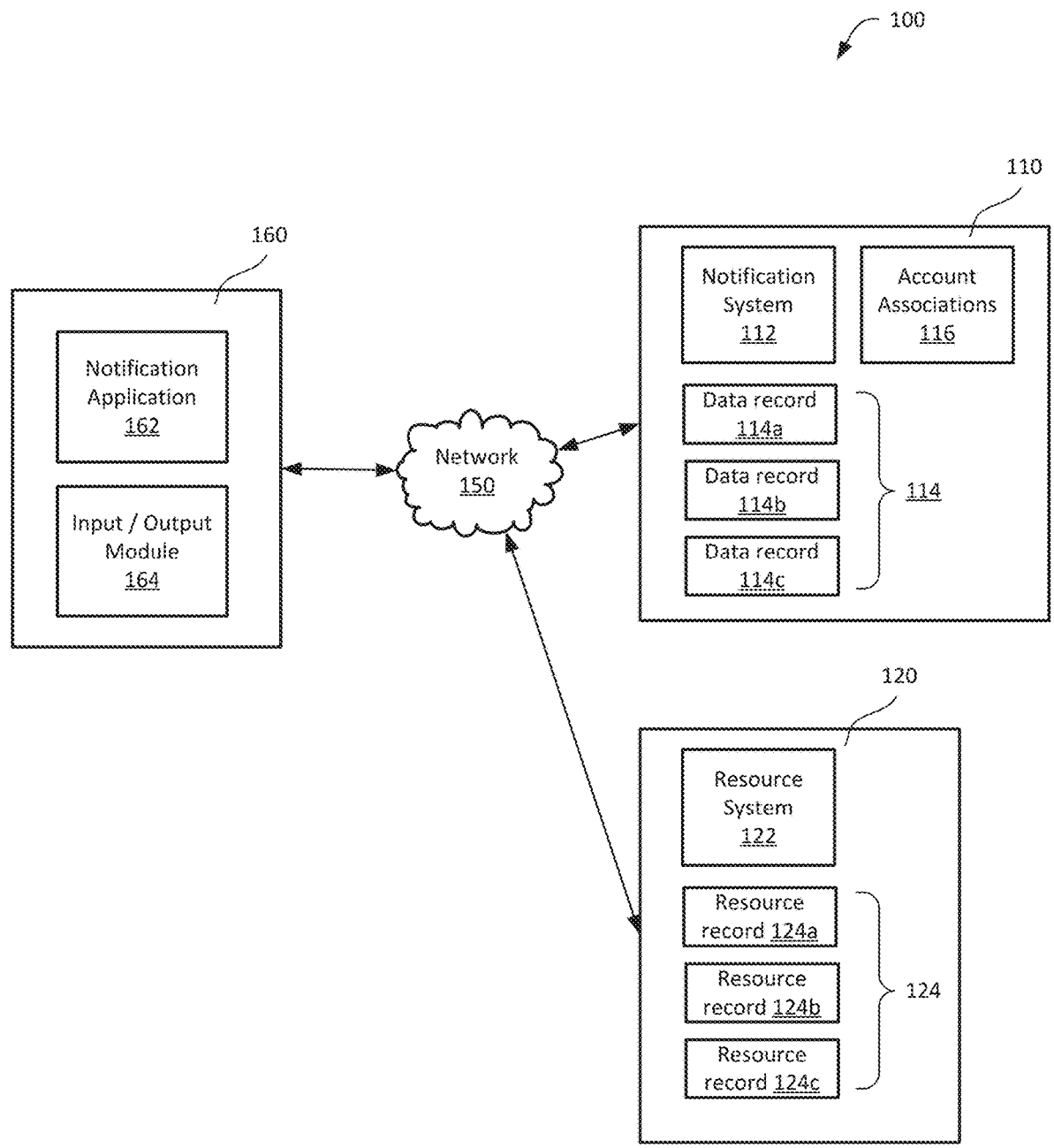
FIG. 1 illustrates, in block diagram form, a system for providing alert notifications, in accordance with an example of the present application.

In one aspect, the present application describes a computing device. The device comprises: a communications module; an input module; a processor coupled to the communications module and the input module; and memory coupled to the processor. The memory stores processor-executable instructions. The processor-executable instructions, when executed, cause the processor to: receive, via the input module, a signal representing a command to set an alert condition associated with an identifier and, in response, generate the alert condition; transmit, via the communications module, a signal representing the alert condition to a monitoring system for setting up a targeted notification for the computing device; receive, via the communications module, a signal representing an asserted alert indicating that the alert condition is satisfied; display, based on the signal representing the asserted alert, an alert notification including the identifier and a first selectable option associated with a first application interface; and in response to receiving, via the input module, a signal representing selection of the first selectable option, display the first application interface and auto-populate a first field based on the identifier.

In another aspect, the present application describes a method of providing alert notifications on a computing device. The method comprises: receiving, via an input module on the computing device, a signal representing a command to set an alert condition associated with an identifier and, in response, generating the alert condition; transmitting, via a communications module, a signal representing the alert condition to a monitoring system for setting up a targeted notification for the computing device; receiving, via the communications module, a signal representing an asserted alert indicating that the alert condition is satisfied; displaying, based on the signal representing the asserted alert, an alert notification including the identifier and a first selectable option associated with a first application interface; and in response to receiving, via the input module, a signal representing selection of the first selectable option, displaying the first application interface and auto-populating a first field based on the identifier.

In another aspect, a non-transitory computer-readable storage medium storing processor-executable instructions that, when executed, cause a processor to carry out the operations of one or more methods described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . ." is intended to cover any one or more of the listed elements, including any one of the listed elements alone, any sub-combination, or all of the elements, without necessarily excluding any additional elements, and without necessarily requiring all of the elements.

Using electronic devices, consumers can retrieve a plethora of information via Internet webpages, mobile application software, or other electronic medium. Information that is particularly useful to a consumer may be contained within large volumes of dynamically updated data sets, documents, or application screens. In some scenarios, due to volume of information, it can be challenging or time consuming to identify the information that is particularly useful to the consumer. The consumer may wish to initiate action on tradeable objects in response to receiving information on tradeable objects of interest. While the electronic device can display large volumes of dynamically updated data sets, documents, or application screens, the input/output module 164 can have physical size limitations and impose constraints on the volume of information or the number of application screens that may be displayed at any given point in time.

Although the consumer can advance several display interfaces for displaying information and for accessing selectable options for taking action on tradeable objects, the consumer can find that monitoring large data sets/documents or that traversing several application interfaces to identify information of interest for initiating action on tradable objects may be time consuming and complicated. For example, the user may find that information of interest may be spread across several application screens and that options for providing instructions to acquire (e.g., buying) or divest (e.g., selling) tradeable objects can be buried within several application screen levels. Further, time delay incurred between (a) the time that the user decides to provide instructions for an action relating to the tradeable object; and (b) the time that the user is able to provide selections or inputs can increase the likelihood that the user selection or input relating to the tradeable objects is obsolete (e.g., the tradeable object is no longer available for acquisition or is no longer desirable by the exchange community for purchase).

It would be advantageous to provide devices and methods for providing alert notifications to address some of the disadvantages described herein.

Reference is made to FIG. 1, which illustrates, in block diagram form, a system 100 for providing alert notifications, in accordance with an example of the present application. The system 100 can include a first server 110, a second server 120, and one or more electronic devices 160. The system 100 includes a network 150 and the first server 110, the second server 120, or the one or more electronic devices 160 are configured to communicate with any other device over the network 150 or with any other similar computing device. The network 150 can include a plurality of interconnected wired and wireless networks, including the Internet, wireless local area networks, wireless area networks, or the like.

The first server 110 may be a single server, multiple servers, a server farm, or any other such arrangement of computing devices to implement computing server-like functionality. The first server 110 includes one or more processors, memory, and a communications module for providing communications capability with other computing devices. As will be described, the first server 110 includes a notification system 112 having processor executable instructions stored in memory that, when executed, cause a processor to provide alert notifications for an electronic device 160 in communication with the first server 110.

The first server 110 includes a plurality of data records (illustrated individually as 114a, 114b, 114c, etc.). The data records may be characterized as data structures having consumer account information that may be associated with users of one or more electronic devices. In some examples, each data record may be an account record associated with an account holder for tradeable objects or resources.

The second server 120 implements a resource system 122 and one or more resource records (illustrated individually as 124a, 124b, 124c, etc.). The resource system 122 can include processor executable instructions stored in memory that, when executed, cause a processor to provide signals representing current status information of a tradable resource. In some examples, the resource system 122 can include processor executable instructions stored in memory that, when executed, cause a processor to identify that one or more alert conditions may be satisfied. The second server 120 can be a back-end server supporting resource queries received from the first server 110.

Resource queries can be associated with one or more resource records 124. In some examples, a resource record 124 is referenced using an identifier. Each resource record 124 can be a dynamically updated record associated with a tradeable object or resource. Tradeable objects or resources can include physical objects, intangible resources (e.g., professional resources, computing resources, etc.), value instruments (e.g., cryptocurrency, bank notes, mutual funds, stocks, bonds, etc.), or other tradeable commodity in a marketplace. The second server 120 may be a single server, multiple servers, a server farm, or any other such arrangement of computing devices to implement computing server-like functionality. The second server 120 includes one or more processors, memory, and a communications module providing network communication capabilities with other computing with other computing devices. In some examples, the second server 120 can be a back-end server in communication with or implemented for a tradable object exchange community, such as an Internet-sharing community, a stock exchange, or similar exchange community.

In FIG. 1, the first server 110 is implemented apart from the second server 120; however, in some examples, the first server 110 and the second server 120 can be included in a single computing server device executing the methods described herein.

The electronic device 160 stores and executes a notification application 162 for connecting with the first server 110 and interacting with the notification system 112. The electronic device 160 includes one or more processors, memory, and a communications module for providing network communications capabilities with other computing devices.

The electronic device 160 includes an input/output module 164. For example, the input/output module 164 can include a touch screen display for displaying a user interface and a touch screen interface for receiving motion or touch input from a user of the electronic device 160. Other examples of the input/output module 164 for displaying content for a user or for receiving input signals representing commands or selectable options from a user of the electronic device 160 are contemplated.

The electronic device 160 includes memory that stores the notification application 162. The notification application 162 includes processor-executable instructions that, when executed, cause a processor to perform operations described herein. For example, the notification application 162 can include processor-executable instructions for: receiving, via an input module, a signal representing a command to set an alert condition associated with an identifier and, in response, generating the alert condition; transmitting a signal representing the alert condition to a monitoring system for setting up a targeted notification for the computing device; receiving a signal representing an asserted alert indicating that the alert condition is satisfied; displaying, based on the signal representing the asserted alert, an alert notification including the identifier and a first selectable option associated with a first application interface; and in response to receiving, via the input module, a signal representing selection of the first selectable option, displaying the first application interface and auto-populating a first field based on the identifier.

Figure 2:
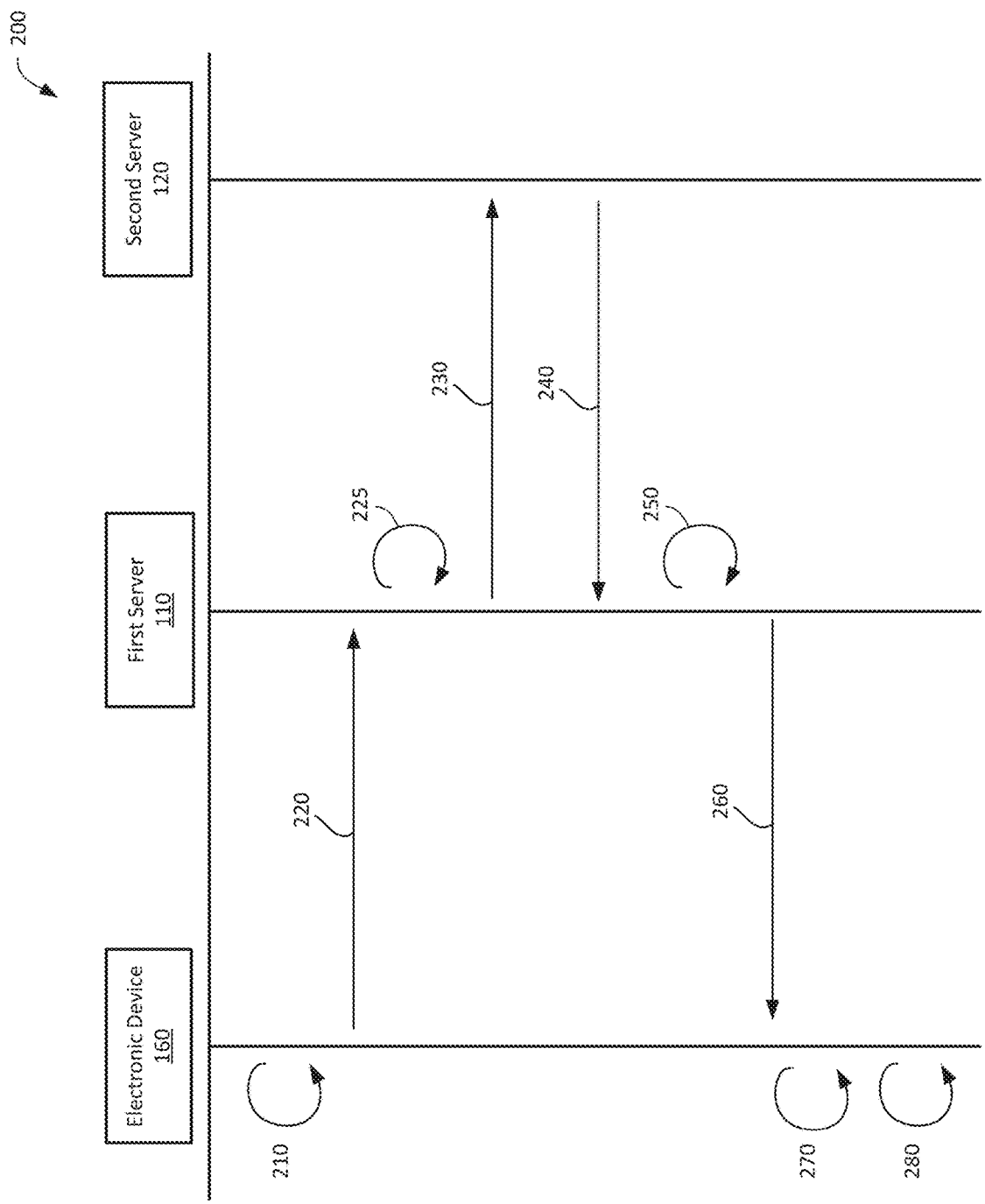
FIG. 2 illustrates a signal diagram illustrating exchanges among computing devices implemented for providing alert notifications, in accordance with an example of the present application.

Reference is made to FIG. 2, which illustrates a signal diagram 200 illustrating exchanges among computing devices implemented for providing alert notifications, in accordance with an example of the present application. FIG. 2 illustrates the electronic device 160, the first server 110, and the second server 120 of FIG. 1.

The first server 110 can be a front-end computing server for managing data records 114 (FIG. 1) associated with consumer accounts for a tradeable object exchange community. In some examples, the second server 120 can be a back-end computing server for processing and recording tradeable object transactions.

As an illustrative example, the first server 110 can be a computing server for an organization such as a banking institution and the second server 120 can be a computing server for a third-party entity managing tradeable objects such as currency, mutual funds, bonds, stocks, on an exchange such as the New York Stock Exchange or the Toronto Stock Exchange. It will be understood that the first server 110 can be a computing server for any other type of organization, such as a goods or services organization and the second server 120 can be a computing server for a third-party services for accessing or managing tradeable objects. As described, the first server 110 and the second server 120 are illustrated as distinct computing devices; however, in some examples, the first server 110 and the second server 120 can be implemented within a single computing device.

The data records 114 (FIG. 1) can be data records for respective customers, where each data record is associated with a customer identifier. The customer identifier can be associated with a user of an electronic device 160, and the electronic device 160 can be in communication with, via the network 150 (FIG. 1), the first server 110. In some examples, the first server 110 includes account associations 116 (FIG. 1) for associating customer identifiers with substantially anonymous identifiers for use at the second server 120. For example, the first server 110 may be a front end computing device for managing customer transaction requests received from the electronic device 160 and the customer transaction requests can be processed or fulfilled based on operations at the second server 120. The second server 120 may be a back-end server operated by a third party entity that is separate from the example financial institution. The account associations 116 can be used to disassociate identifiable customer information from tradeable object transaction information.

The signal diagram 200 illustrates operations that may be implemented, at least in part, through processor-executable instructions stored at the respective devices or servers. The operations may be carried out by one or more processors of the respective devices, servers, or applications thereon.

At operation 210, the electronic device 160 receives, via an input module, a signal representing a command to set an alert condition associated with an identifier. In response to receiving the signal representing the command to set the alert condition associated with the identifier, the electronic device 160 generates the alert condition. The command to set an alert condition can be received via a graphical user interface of the electronic device 160. Further, the identifier is used to identify a tradeable object which the user of the electronic device 160 desires to be monitored.

To illustrate example methods described herein, a tradeable object may be a value instrument having a market value that is dependent on various factors associated with an exchange community. For example, a value instrument may be a stock, bond, mutual fund, or other type value instrument. A consumer operating the electronic device 160 may desire to receive an alert notification when the value of the tradable object meets a condition or threshold.

The consumer using the electronic device 160 can provide a signal representing a command to set the alert condition via an input device, such as a touch screen display. For example, the touch screen display can provide a user interface for receiving an identifier and for receiving parameters for setting up the desired alert condition. The identifier can specify a particular tradeable object (e.g., Toronto-Dominion Bank stock) and the alert condition can include at least one of a time period or a threshold. In the example where the tradeable object is a publically traded stock on a stock exchange, the identifier can be a ticker symbol used for identifying the publically traded stock on the stock exchange. The alert condition can be based on one or more conditions, such as: whether the tradeable object value is lower than a threshold value, whether the tradeable object value is higher than a threshold value, whether the tradeable object value is at a new 52 week high or a new 52 week low, etc.

In some examples, the alert conditions can be single-use alerts, permanent alerts, or a combination of single-use or permanent alerts. Single-use alerts include conditions for providing an alert notification and subsequently disabling the alert condition once the alert condition has been met (e.g., a condition relating to a tradeable object surpassing an absolute threshold). Permanent alerts can include conditions that are triggered each time the alert condition is satisfied (e.g., new tradeable object 52-week high or new tradeable object 52-week low) and can be a condition relating to a tradeable object surpassing a relative threshold or a continually evolving threshold.

At operation 220, the electronic device 160 transmits, via a communication module, a signal representing the alert condition to the first server 110 for setting up a targeted notification for the electronic device 160. The first server 110 can be a monitoring server for receiving alert conditions generated by the electronic device 160, monitoring whether a tradeable object associated with the identifier in the alert condition meets the alert condition, and providing a signal representing an asserted alert indicating that an alert condition is satisfied. In some examples, it can be contemplated that the second server 120 monitors whether a tradable object associated with the identifier in the alert condition meets the alert condition and, subsequently, provides a signal representing an asserted alert to the first server 110 indicating that an alert condition is satisfied.

When the first server 110 receives the signal representing the alert condition, the first server 110, at operation 225, can associate the alert condition with a data record 114 (FIG. 1). That is, the first server 110 can identify the data record 114 of an account corresponding to the user of the electronic device 160. For example, the user of the electronic device 160 may have an electronic trading account associated with a data record 114, and the data record 114 can include data fields storing user information or particulars relating to tradeable objects that are held by that user. The data record 114 can also include user-defined quantities associated with that account record, such as user preferences for tradeable object transactions (e.g., when alert condition met, acquire 10 units of tradeable object X).

In some examples, the first server 110 can retrieve, using account associations 116, a non-descriptive identifier associated with the account user and the non-descriptive identifier can be used for identifying or recording tradeable object transactions with the second server 120. Because the second server 120 may be maintained by a third-party that is separate from the entity operating the first server 110, the non-descriptive identifier can be used for disassociating or pseudo-anonymizing tradeable object transactions such that personally identifiable information at the second server 120 is reduced and such that signals representing tradeable object transactions may be transmitted to the second server in aggregate.

At operation 230, the first server 110 transmits a signal representing an information query based on an identifier associated with a tradeable object. For example, the information query can include a query on the current tradeable object value (e.g., stock price), trend information associated with the tradeable object, information regarding price bids or asks from other tradeable object exchange community participants (e.g., other stock traders), etc. The first server 110 can submit information queries at periodic time intervals or can submit information queries in response to ad hoc scenarios where the first server 110 requires data sets for identifying whether any alert conditions of one or more targeted notifications may be satisfied.

At operation 240, the second server 120 transmits a signal representing response data in response to the information query that was transmitted at operation 230. The response data can include complete data sets associated with one or more identifiers transmitted with the information query in operation 230. In some examples, the response data can include subsets of data sets associated with the one or more identifiers transmitted with the information query in operation 230. For example, when the information query is used for determining whether single-use or discrete price thresholds for tradeable objects are met, the response data may include data values from a subset of data fields, such as price data fields, associated with respective resource records 124 (FIG. 1). In some scenarios, it is desirable for the second server 120 to transmit response data to the extent that is required for fulfilling the information queries at operation 230. Reducing the amount of data transmitted among computing devices can reduce the data throughput bandwidth required between the respective computing devices.

At operation 250, the first server 110 determines based on the response data whether an alert condition of one or more targeted notifications is met. For example, the electronic device 160 may have previously transmitted a signal representing a command to set an alert condition associated the ticker symbol for Toronto-Dominion Bank stock (e.g., tradeable object) such that the alert condition would be met when the market value of the Toronto-Dominion Bank stock exceeds a running 52-week high price.

When the first server 110, at operation 250, determines based on received response data that the alert condition associated with the identifier is satisfied, the first server 110, at operation 260, transmits a signal representing an asserted alert indicating that the alert condition is satisfied. Continuing with the example described above, when the first server 110 determines based on received response data that the market value of the Toronto-Dominion Bank stock exceeds a previous 52-week high price, the first server 110 transmits a signal representing an asserted alert indicating that the alert condition is satisfied. Further, at operation 260, the electronic device 160 receives a signal representing an asserted alert indicating that the alert condition is satisfied.

At operation 270, the electronic device 160 displays, based on the signal representing the asserted alert, an alert notification including the identifier and a first selectable option associated with a first application interface. As will be described herein, the first application interface can be a deep-linked application interface. For example, the first selectable option can be associated with a reference or uniform resource identifier (URI) that links to a specific location or application interface within the notification application 162 (FIG. 1) executing on the electronic device 160. That is, the first selectable option is not simply a URI for launching the notification application 162 or other application operating on the electronic device 160. Continuing with the above described illustrating example, at operation 270, the electronic device 160 can display, based on the signal representing the asserted alert, an alert notification that the Toronto-Dominion Bank stock exceeds a previous 52-week high price. In some examples, the alert notification can be a banner message on a home screen of the electronic device 160 having text indicating that the tradeable object value has met the alert condition. Further, the alert notification can include one or more selectable options associated with respective application interfaces. For example, a selectable option can be a selectable icon for receiving input from the user of the electronic device 160. As will be illustrated in an example herein, a selectable option can be an icon for receiving at least one of "trade", "quote" or "reset" options. Each respective selectable option can be associated with a particular application interface for particular application functions. For example, when the first selectable option is associated with a "trade" option, the first application associated with the first selectable option can include a deep-linked application interface for receiving parameters associated with generating instructions for an acquire or divest operation for the tradable object associated with the identifier.

In response to receiving, via the input/output module 164, a signal representing selection of the first selectable option, at operation 280, the electronic device 160 displays the first application interface and auto-populates a first field based on the identifier. As described, the first application interface can be a deep-linked application interface for receiving instructions associated with acquiring or divesting tradeable objects. In the illustrative example, the first application interface can be a "trade" application interface that includes: the identifier (e.g., ticker symbol for tradeable object), a current price, selectable options for choosing "buy" or "sell", fields for specifying quantity of tradeable objects, a price for the acquire/divest operation, a field for identifying time limits (e.g., when the trade operation shall be valid until), a field for the user of the electronic device 160 to enter an account password, or fields for specifying information relating to the acquire/divest operation.

At operation 280, the electronic device 160 auto-populates a first field based on the identifier. For example, in the first application interface, the electronic device 160 can auto-populate a tradeable object name field with the stock ticker symbol "TD" for Toronto-Dominion Bank stock on the Toronto Stock Exchange or on the New York Stock Exchange. In some examples, the first field being based on the identifier can be the full legal name of the organization associated with the tradeable object (e.g., Toronto-Dominion Bank). In some other examples, the first field being based on the identifier can be a "Bid" or "Ask" price associated with the tradable object at the given time.

Described above, at operation 250, the first server 110 determines based on response data whether an alert condition of a target notification is met; however, it can be contemplated that the determination on whether an alert condition of the target notification is met may be conducted or performed at the second server 120.

Based on the above example, the electronic device 160 provides: (a) display of targeted information that the user of the electronic device 160 is interested in and without having to advance through several application interface screens containing large volumes of information; (b) one or more selectable options for the user of the electronic device 160 to select an action based on the displayed targeted information; and (c) display of a first application interface associated with respective selectable options for receiving instructions for an action following display of targeted information that was sought by the user of the electronic device 160.

Figure 3:
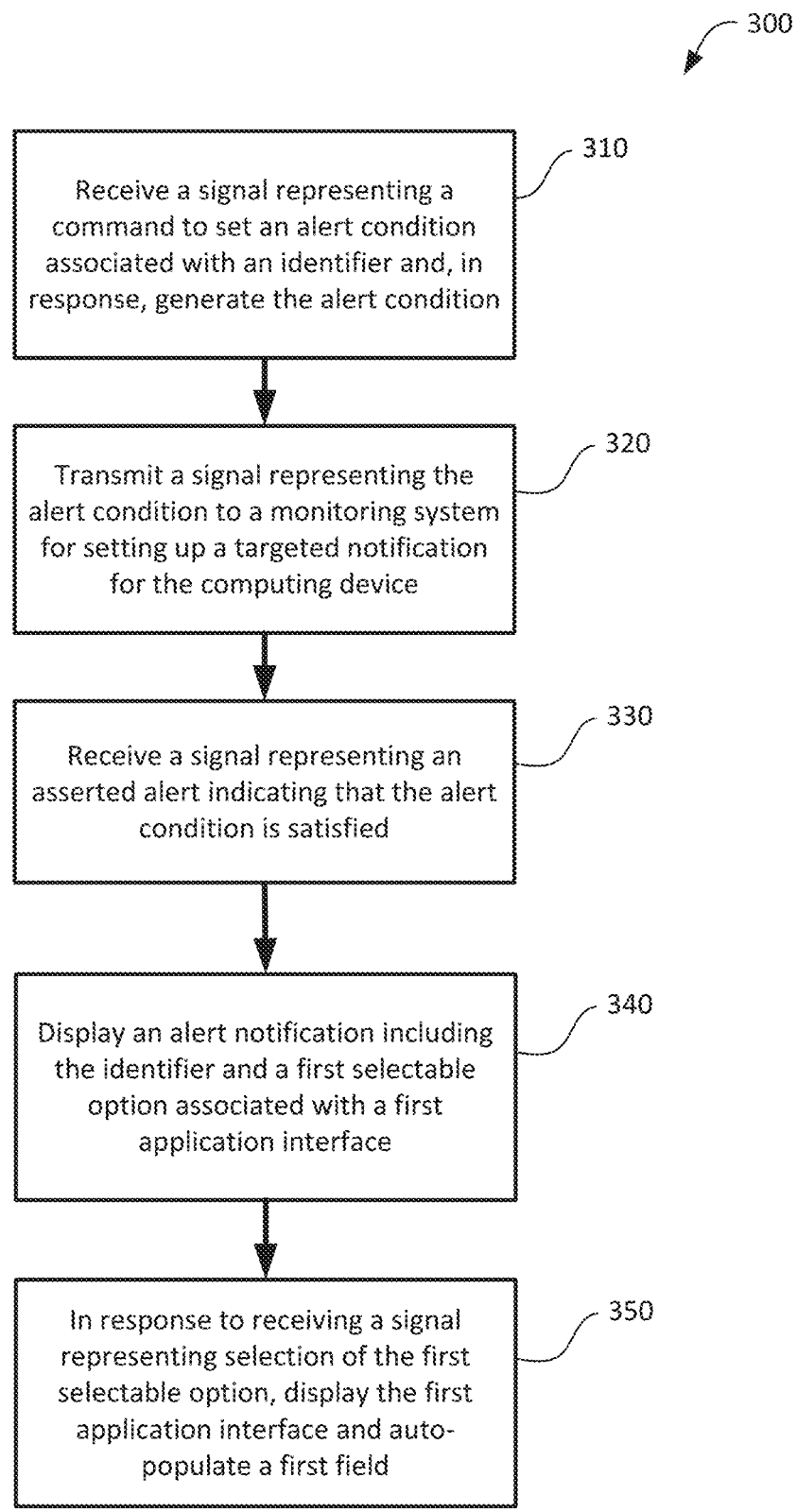
FIG. 3 illustrates, in flowchart form, a method of providing alert notifications on an electronic device, in accordance with an example of the present application.

Reference is now made to FIG. 3, which illustrates, in flowchart form, a method 300 of providing alert notifications on an electronic device 160 (FIG. 1), in accordance with an example of the present application. The method 300 includes operations that may be carried out by one or more processors of the electronic device 160. For example, the method 300 can be implemented, at least in part, through processor-executable instructions associated with the notification application 162 (FIG. 1). In some examples, one or more of the operations may be implemented via processor-executable instructions in other applications or in an operating system stored and executed on the electronic device 160. The electronic device 160 can include a display.

At operation 310, the processor receives, via an input module, a first signal representing a command to set an alert condition associated with an identifier and, in response, generates the alert condition. The identifier can be a tradeable object identifier or a tradeable resource identifier. For example, a tradeable object or resource can include physical objects, intangible resources (e.g., professional resources, computing resources, etc.), value instruments (e.g., cryptocurrency, bank notes, mutual funds, stocks, bonds, etc.), or other tradeable commodity in a market place. A tradeable object identifier can be a name or acronym associated with the tradeable object that is recognizable by the first server 110 (FIG. 1) or the second server 120 (FIG. 1) that is associated with a tradeable object exchange community.

As described herein, alert conditions can be single-use alerts, permanent alerts, or a combination of single use or permanent alerts. Alert conditions can be defined as conditions that can be met. For example, a single-use alert is a condition that, once met, is disabled (e.g., a condition relating to a tradeable object surpassing an absolute threshold). In another example, a permanent alert can include conditions that are triggered when one or more relative conditions are satisfied, such as when a tradeable object value surpasses a dynamically evolving or relative threshold (e.g., tradeable object value reaching a new 52-week low).

In some examples, the command to set an alert condition associated with the identifier can include a user-defined quantity associated with an account associated with the electronic device 160. When receiving the command to set an alert condition, the electronic device 160 can receive, via the input module, signals representing user preferences for tradeable object transactions. For example, user-defined quantities can include the number of units of a tradeable object that the user wishes to acquire/divest in response to the alert condition being satisfied. The signals representing user preferences can be received via a graphical user interface displayed on a touch screen display screen of the electronic device 160. The user-defined quantity can be stored in memory of the electronic device 160. In some examples, the user-defined quantity can alternatively be transmitted to the first server 110 and the first server 110 can store the user-defined quantity in a data record 114 (FIG. 1) associated with an account for the user of the electronic device 160.

At operation 320, the processor transmits, via the communication module, a second signal representing the alert condition to the first server 110 (FIG. 1) for setting up a targeted notification for the computing device. The first server 110 can be a monitoring system. The first server 110 can receive alert conditions generated by the electronic device 160, determine whether a tradeable object associated with the identifier in the alert condition meets the alert condition, and provide a signal representing an asserted alert indicating that an alert condition is satisfied.

At operation 330, the processor receives, via the communication module, a third signal representing an asserted alert indicating that the alert condition is satisfied. In some examples, the signal representing the asserted alert can include an indication that one or more distinct alert conditions are satisfied. For example, the signal representing the asserted alert condition can include an indication that an alert condition for a tradeable object associated with a first identifier is satisfied and also an indication that an alert condition for a second tradeable object associated with a second identifier is satisfied. Thus, the signal representing the asserted alert can indicate that several targeted notifications are to be displayed by the electronic device 160.

At operation 340, the processor displays on the display, based on the third signal representing the asserted alert, an alert notification including the identifier and a first selectable option associated with a first application interface. As will be illustrated in example user interfaces herein, the alert notification can be provided on a home screen of the electronic device 160. That is, when the electronic device 160 is locked or when the display screen is off, the processor, at operation 340, can light up a display screen to display the alert notification on the home screen of the electronic device 160. In some other examples, the alert notification can be provided on any other screen while the electronic device 160 may be in use and displaying other content. In some examples, the processor can be configured to additionally provide a mechanical vibration alert or an acoustic alert along with the displayed alert notification. When the processor lights up the display screen to provide the visual alert notification, the user of the electronic device 160 is provided with targeted information without having to advance through several application pages. Further, when the processor enables the display screen to provide the visual alert notification, the processor provides at least one selectable option (e.g., a first selectable option) such that the processor can receive an instruction for an action. That is, the user of the electronic device 160 can provide instructions, via the selectable option, in response to receiving the alert notification. As an illustrative example, the alert notification can include a text box stating that "TD price rises above $70 with a trade of $70.85".

As will be illustrated herein, in some examples, the displayed alert notification can include one or more selectable options. For example, the alert notification can include three selectable options, including "Trade", "Quote", and "Reset". Each of the selectable options can be associated with a discrete application interface, where the respective application interface can be a unique deep-linked application interface for receiving instructions associated with a subsequent action instruction. Three selectable option examples are illustrated herein; however, any other type of selectable options are contemplated.

In response to receiving, via the input module, a fourth signal representing selection of the first selectable option, at operation 350, the processor displays on the display the first application interface and auto-populates a first field based on the identifier. For example, the first application interface can be auto-populated with the identifier associated with the tradeable object (e.g., stock ticker symbol "TD" for Toronto-Dominion Bank stock on a stock exchange).

In some other examples, the processor can be further configured to retrieve a user-defined quantity associated with an account associated with the electronic device 160. For example, the user-defined quantity can be a user preference for tradeable object transactions and can be retrieved from memory of the electronic device 160. In some examples, the user-defined quantity can be stored in a data record 114 (FIG. 1) that is associated with the account for the electronic device 160 and can be retrieved from the first server 110 (FIG. 1).

Further, the processor can be configured to auto-populate and display a further field with the user-defined quantity. For example, if the user-defined quantity is a user preference specifying that the processor is to acquire 10 units of the tradeable object associated with the identifier when the alert condition is met, the processor can auto-populate the further field of the first application interface with "10 units" of "TD" stock for acquisition (buy). Auto-populating a user-defined quantity that was previously saved by a user of the electronic device 160 results in the electronic device 160 receiving instructions, via the input module, for conducting an action after displaying the alert notification. That is, auto-populating commonly used fields of the first application interface saves the user from needing to input commonly utilized information for taking an acquire or divest action for the tradeable object.

In some scenarios, it may be desirable for the electronic device 160 to determine whether the command to set an alert condition would be useful. For example, the command to set an alert condition may be moot if the command to set an alert condition includes conditions that would be nonsensical. As an illustrative example, the processor may receive a command to set an alert condition for determining that a market value of a tradeable object drops below a threshold price (e.g., $80 threshold price). In the present example, if the current market value of the tradeable object identified by the identifier is already valued at a market value below the threshold price, the command to set the alert condition associated with that tradeable object can be determined to be erroneous. Such an example method will be described with reference to FIG. 4.

Figure 4:
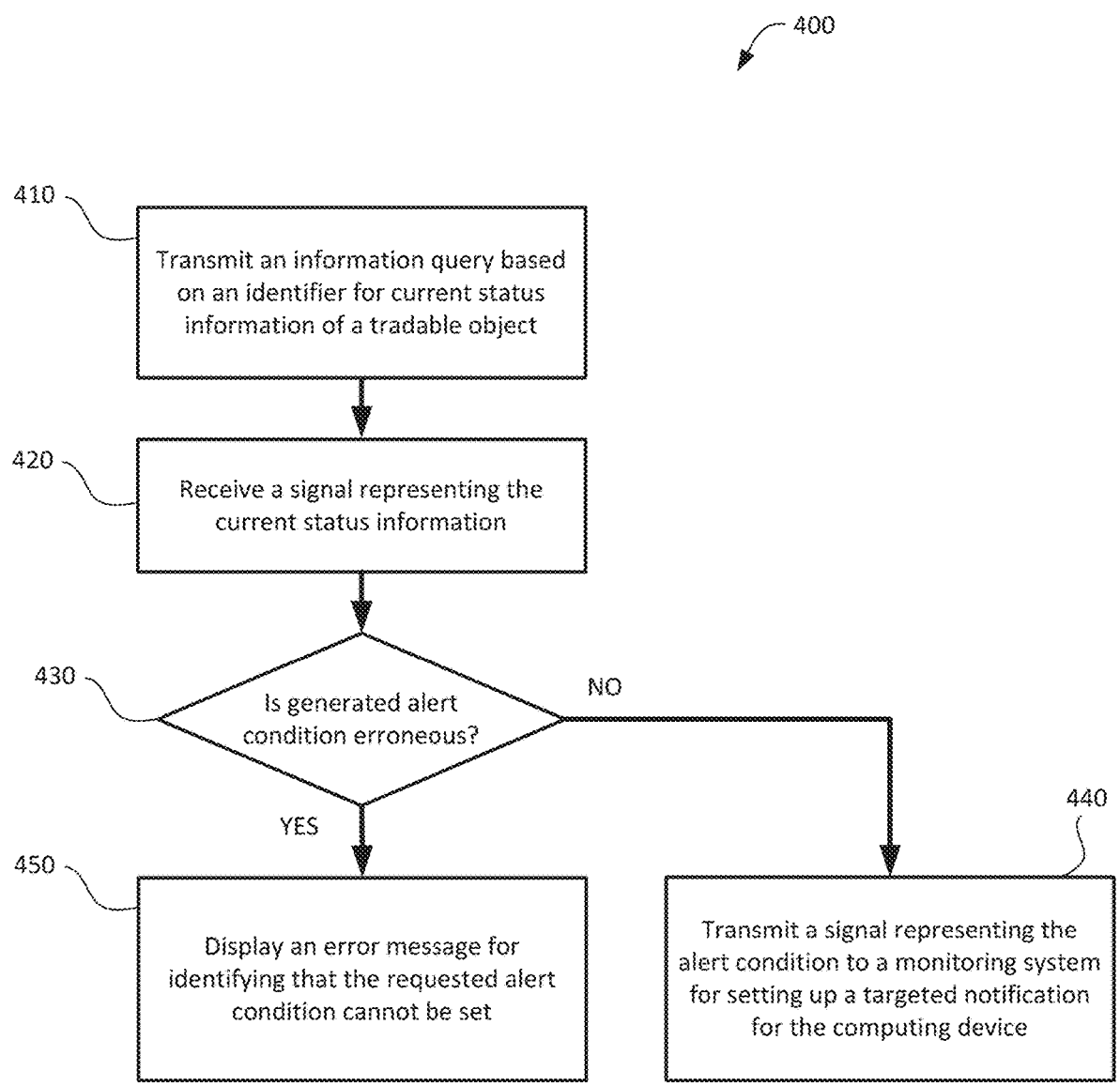
FIG. 4 illustrates, in flowchart form, a method of providing alert notifications on an electronic device, in accordance with another example of the present application.

Reference is made to FIG. 4, which illustrates, in flow-chart form, a method 400 of providing alert notifications on an electronic device 160 (FIG. 1), in accordance with another example of the present application. The method 400 includes operations that may be carried out by one or more processors of the electronic device 160. For example, the method 400 can be implemented, at least in part, through processor-executable instructions associated with the notification application 162 (FIG. 1). In some examples, one or more of the operations may be implemented via processor-executable instructions in other applications or in an operating system stored and executed on the electronic device 160.

At operation 410, the processor transmits a signal representing an information query based on the identifier for current status information for a tradable object or resource. In some examples, the information query can include a request for specific information for determining whether a command to set an alert condition would result in a non-sensical notification.

At operation 420, the processor receives a signal representing the current status information associated with the tradeable resource identified by the identifier.

At operation 430, the processor determines, based on the signal representing the current status information, whether the generated alert condition is erroneous. Continuing with the example described above, the current status information can include a current market value of the tradeable object identified by the identifier. Thus, the processor can compare, based on the received current status information, the current market value of the tradeable object and the user-specified threshold price to determine whether the current market value is already below the user-specified threshold price. That is, at operation 430, the processor can determine whether the generated alert condition is erroneous.

When the processor determines that the generated alert condition is not erroneous, at operation 440, the processor transmits, via the communications module, a signal representing the alert condition to the first server 110 (FIG. 1) for setting up a targeted notification for the computing device. Operation 440 in FIG. 4 can be similar to operation 320 of FIG. 3.

When the processor determines that the generated alert condition is erroneous, at operation 450, the processor displays an error message at the electronic device 160 for identifying that the requested alert condition may be erroneous and cannot be set. Continuing with the example described above, the processor can display an error message notifying the user of the electronic device 160 that the current market value of the tradeable object is already below the threshold specified in the alert condition and that the alert condition may not be useful. That is, the error message can notify the user of the electronic device 160 that the requested alert condition is already met (e.g., alert condition already met upon generation of the alert condition) or that the generated alert condition cannot be met based on the current status information received from the first server 110.

In some examples, the electronic device 160 can be configured to provide suggested alert conditions that may be related to or useful in view of the generated alert condition. For example, the processor can display alert condition suggestions for the user such that multiple alert conditions can be concurrently setup. For example, in response to receiving a signal representing a command to setup an alert condition to monitor percentage change of a tradeable object value, the processor can display a suggestion to setup another alert condition to identify when the tradable object value exceeds a set threshold. In this example, a relative tradeable object value percentage change and an absolute tradeable object value can be monitored.

As described, the example alert notifications can include a first selectable option associated with, for example, a first application interface. The example first application interface can include a deep-linked application interface for receiving instructions from the input module for divesting or selling one or more tradable objects. However, if the account associated with the user of the electronic device 160 does not hold any tradeable objects, the user associated with the account cannot divest or sell tradeable objects that she may not hold. It may be desirable for the processor to determine whether accounts are associated with tradeable resources prior to providing deep-linked application interfaces for receiving action instructions on tradeable objects. An example method will be described with reference to FIG. 5.

Figure 5:
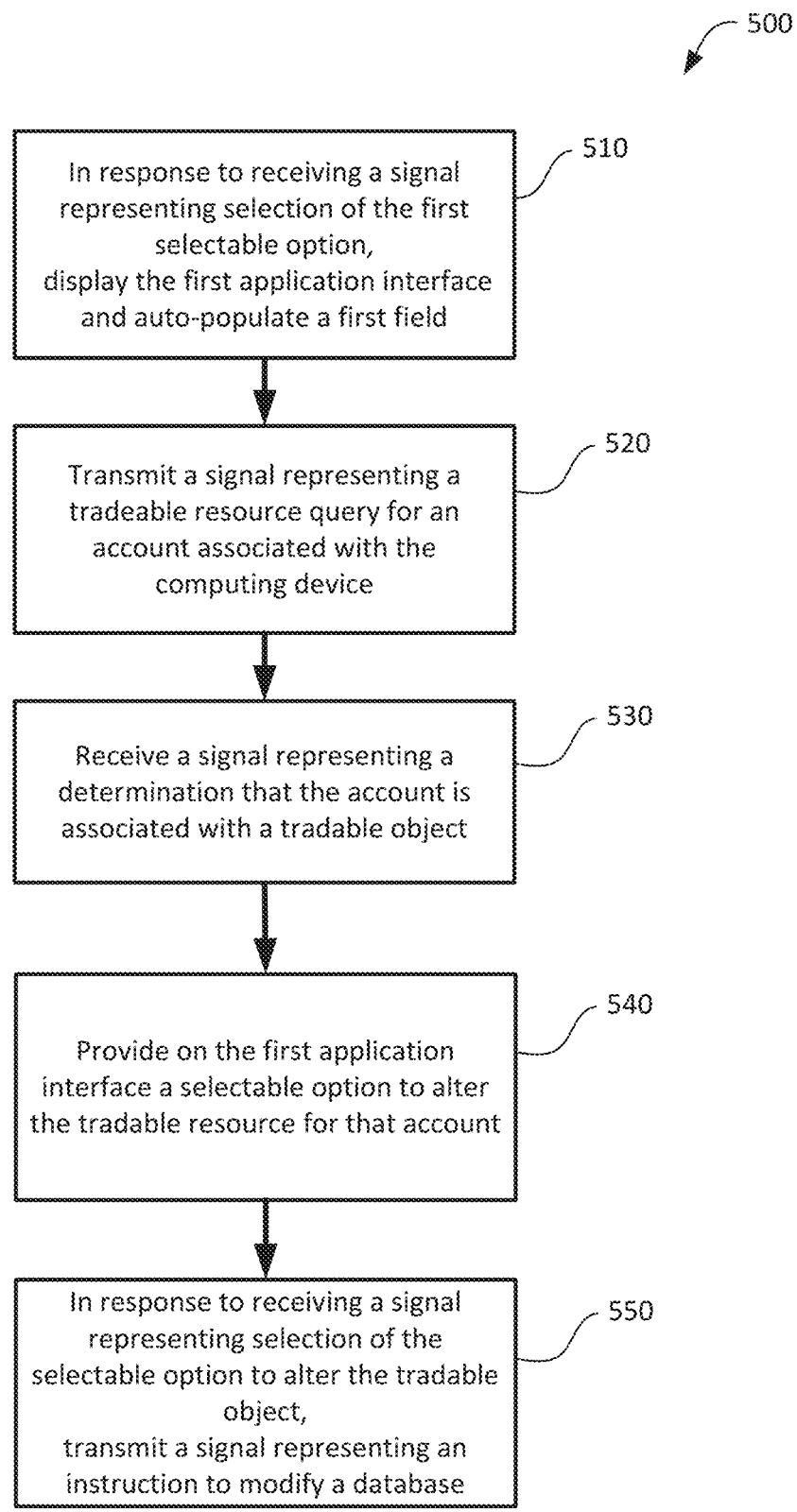
FIG. 5 illustrates, in flowchart form, a method of providing alert notifications on an electronic device, in accordance with another example of the present application.

Reference is made to FIG. 5, which illustrates, in flowchart form, a method 500 of providing alert notifications on an electronic device 160 (FIG. 1), in accordance with another example of the present application. The method 500 includes operations that may be carried out by one or more processors of the electronic device 160. For example, the method 500 can be implemented, at least in part, through processor-executable instructions associated with the notification application 162 (FIG. 1). In some examples, one or more of the operations may be implemented via processor-executable instructions in other applications or in an operating system stored and executed on the electronic device 160.

At operation 510, in response to receiving, via the input module, a signal representing selection of the first selectable option, the processor displays the first application interface and auto-populates a first field based on the identifier. Operation 510 of FIG. 5 may be similar to operation 350 of FIG. 3.

At operation 520, the processor transmits, to the first server 110 (FIG. 1), a signal representing a tradeable resource query based on the identifier for an account associated with the electronic device 160 (e.g., a fifth signal). For example, the tradeable resource query can include the identifier for identifying the tradeable object associated with the alert notification and can include a customer identifier for an account associated with the electronic device 160. The customer identifier can be used to locate a data record 114 that is associated with the user of the electronic device 160 for determining that the data record 114 identifies that the account holder holds one or more units of the tradeable object of interest. In some examples, when the data record 114 for the account holder does not indicate any units of the tradeable object of interest, the electronic device 160 can be configured to not provide a selectable option for executing divest or sell actions on the tradeable object.

At operation 530, the processor receives, via the communication module, a signal representing tradable resource data in response to the tradeable resource query for the account associated with the electronic device 160. The tradeable resource data can be based on data of the data record 114 (FIG. 1) and can include an indication that the tradeable resource of interest is held by the account holder. In addition, the tradeable resource data can include a quantity (e.g., number of units) of the tradeable resource that is held by the account holder.

At operation 540, in response to determining that the account associated with the customer identifier is associated with the tradeable object specified by the identifier (e.g., ticker symbol), the processor provides, on the first application interface, a selectable option to reduce the tradeable resource specified by the identifier for that account.

In contrast, when the processor determines that the account associated with the customer identifier is not associated with the tradeable object specified by the tradeable object identifier, the processor can provide the first application interface without a selectable option for reducing a tradeable resource quantity or holding. For example, the first application interface may provide a sole selectable option for buying or acquiring a tradeable resource quantity or holding.

Following operation 550, in response to receiving, via the input module, a signal (e.g., a sixth signal) representing selection of the selectable option to reduce the tradeable resource specified by the identifier (e.g., tradeable object identifier, such as a ticker symbol), the processor transmits, to the first server 110, a signal (e.g., a seventh signal) representing an instruction including the tradeable object identifier and a quantity value associated with that identifier to modify a database based on the identifier and the quantity value associated with that tradeable object identifier. For example, the database can be a value instrument order book used for recording pending transactions for tradeable objects.

Figure 6:
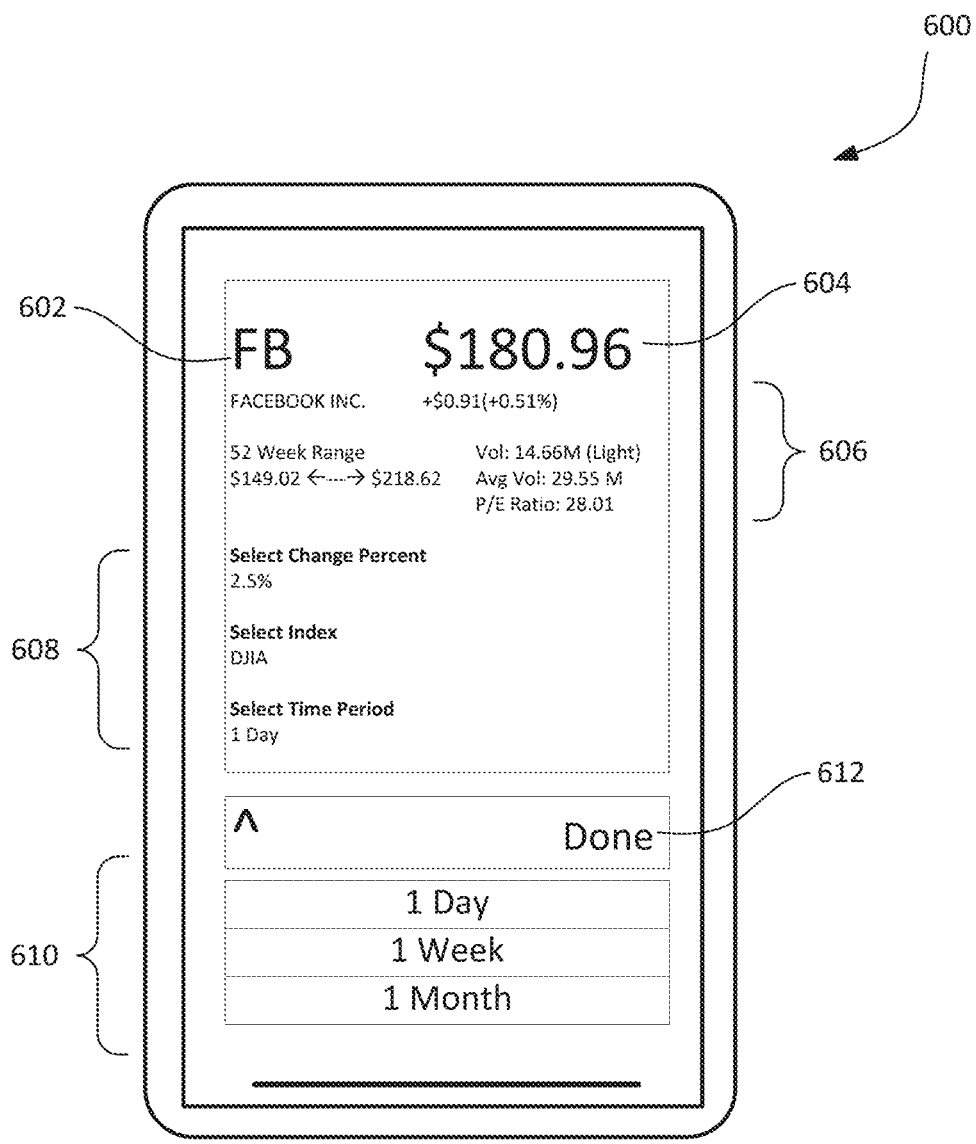
FIG. 6 illustrates a user interface for generating an alert condition, in accordance with an example of the present application.

Reference is now made to FIG. 6, which diagrammatically illustrates an electronic device user interface 600 for providing an alert condition, in accordance with an example of the present application. The user interface 600 may be provided by the notification application 162 (FIG. 1) executing on the electronic device 160 (FIG. 1). In the present example, the notification application 162 has been launched or instantiated and the electronic device 160 presents the user interface 600 for display on the output module of the electronic device 160. The output module may be a touch screen display, such as the one illustrated. Other output modules for providing the user interface 600 can be contemplated.

As described herein, the electronic device 160 receives a command to set an alert condition associated with an identifier and, in response, generates the alert condition. In the present example, the user interface 600 can be used for receiving, via an input module, instructions for generating the alert condition. As shown in FIG. 6, the user interface 600 provided by the notification application 162 includes an identifier. The identifier can be a tradeable object identifier 602 associated with a tradeable object and can be recognized by the first server 110 (FIG. 1). In the illustrated example, the identifier is a stock ticker symbol for Facebook Inc. The user interface 600 also includes a current market price 604 and market price trend data 606. For example, the market price trend data 606 can indicate how the market value of the tradeable object has changed since a prior point in time.

For generating a signal representing a command to set an alert condition associated with an identifier (e.g., operation 310 of FIG. 3), the user interface 600 can include one or more criteria fields 608 for receiving criteria for setting the alert condition. For example, the user interface 600 illustrates a criteria field for selecting a market value percentage change as a criteria. In FIG. 6, the user may modify the "Select Change Percent" field to request that an alert notification be provided when the market value of the tradeable object (e.g., FB stock) changes by more than 2.5% from the current market value. Further, the example user interface 600 may receive, via the input module, market index that the percentage change is to be evaluated against. For example, in FIG. 6, the user may select the Dow Jones Industrial Average index for the alert condition. Further, the example user interface 600 may receive, via the user input, user selection of a time period for the alert condition. In FIG. 6, the user interface 600 may receive the time period, such as "1 Day" via a scrollable list 610 of time periods.

When the user completes providing criteria for setting the alert condition, such as via the one or more criteria fields, the user may select a user interface element for completing the input of criteria, for example by selecting the "Done" user interface element 612. When the electronic device 160 receives, via the input module (e.g., touch screen input module), a signal identifying that the "Done" user interface element 612 is selected, the electronic device 160 conducts an operation to generate the alert condition. The above example to receive criteria for setting the alert condition, to receive a signal identifying that the "Done" user interface element 612 is selected, and to generate the alert condition can correspond to operation 310 of FIG. 3. The user interface 600 illustrated herein is an illustrative example; however, other user interfaces having variations of criteria/criteria fields for setting alert conditions can be contemplated.

Figure 7:
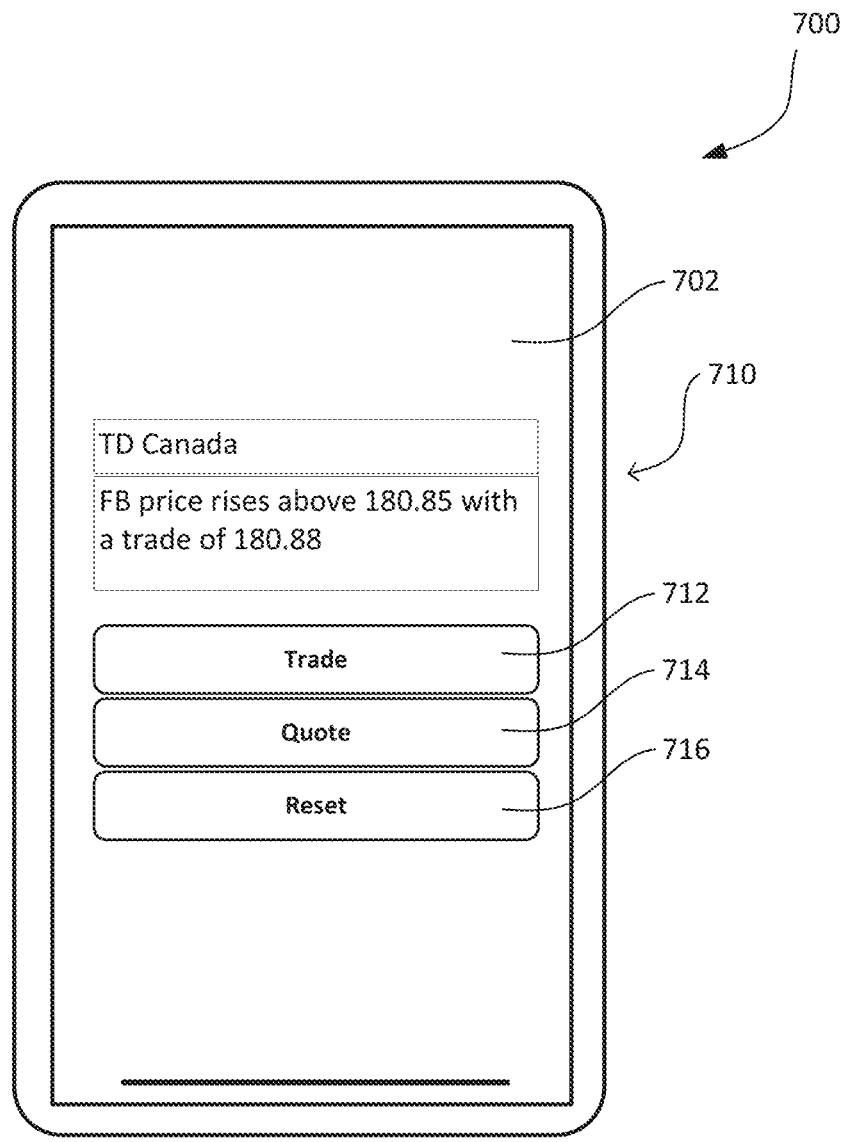
FIG. 7 illustrates a user interface for providing alert notifications, in accordance with an example of the present application.

Reference is made to FIG. 7, which diagrammatically illustrates an electronic device user interface 700 for providing alert notifications, in accordance with an example of the present application. In the example illustrated in FIG. 7, user interface 700 is based a home screen 702 of the electronic device 160. That is, the electronic device 160 may display the home screen 702 when the electronic device 160 is in a locked state or when the electronic device is at a default operating system screen. In some examples, displaying, by the electronic device 160, the user interface 700 for providing alert notifications corresponds to displaying an alert notification described at operation 340 in FIG. 3.

The user interface 700 includes an alert notification 710 for providing information relating to an asserted alert indicating that an alert condition is satisfied. In FIG. 7, the alert notification 710 includes an indication of the notification application that has provided the alert notification 710. For example, the alert notification 710 identifies the "TD Canada" application as the originator of the alert notification 710. Further, the alert notification 710 includes a textual field stating that "FB price rises above 180.85 with a trade of 180.88". The example textual field specifies how the alert condition associated with the identifier (e.g., stock ticker symbol "FB") is satisfied.

The alert notification 710 includes a plurality of selectable options. For example, the alert notification 710 includes a first selectable option 712 labeled as "Trade" associated with receiving instructions, via an input module (e.g., touch screen display), for an action to acquire or divest tradeable objects associated with the identifier. The first selectable option 712 is associated with a first deep-linked application interface for receiving instructions to promulgate an action for the tradeable object associated with the identifier. As will be illustrated herein, the first deep-linked application interface can be a user interface for receiving instructions for executing a tradeable object transaction. In the present example, the alert notification 710 including the first selectable option 712 can correspond to the alert notification described herein at operation 340 of FIG. 3.

The alert notification 710 also includes a second selectable option 714 labeled as "Quote" associated with receiving instructions for an action to receive quotation information for the tradeable object associated with the identifier. Further, the alert notification 710 includes a third selectable option 716 labeled "Reset" associated with receiving instructions for an action to edit or create an alert condition for setting up a subsequent targeted notification for the electronic device 160.

The user interface 700 and features of the alert notification 710 illustrated herein are illustrative only. Variations in the user interface features for providing alert notifications and the functionality associated with the selectable options can be contemplated. For example, the respective selectable options can be associated with receiving instructions for an action different than those described herein. For example, a selectable option can be associated with receiving instructions to share the information contained in the alert notification with another electronic device.

Figure 8:
FIG. 8 illustrates a user interface, in accordance with an example of the present application.

Reference is now made to FIG. 8, which diagrammatically illustrates an electronic device user interface 800, in accordance with an example of the present application. The user interface 800 is an example of a first application interface described herein. That is, the user interface 800 may be associated with the first selectable option 712 (FIG. 7) labelled as "Trade". The user interface 800 is a deep-linked application interface where a first field is auto-populated with the identifier. For example, the identifier (e.g., ticker symbol for Facebook Inc. stock) is auto-populated in a tradeable object identifier field 802. The user interface 800 is configured to receive instructions, via the input module, for promulgating a transaction for the tradeable object (e.g., Facebook Inc. stock). In some examples, the displayed first application interface described herein at operation 350 of FIG. 3 can be the user interface 800 illustrated in FIG. 8. That is, the user interface 800 is the first application interface (at operation 350) and the auto-populated first field (at operation 350) can be the tradeable object identifier field 802.

The user interface 800 may also be configured to receive, via the input module, instructions relating to other criteria for promulgating the transaction for the tradeable object. For example, the user interface 800 can provide a price field 804 for receiving a signal representing a price that the user of the electronic device 160 at which the user is willing to buy/sell the tradeable object.

In the example illustrated in FIG. 8, the user interface 800 includes other input fields for receiving criteria relating to promulgating tradeable object transactions. In some examples, the input fields can include an "Action" field 806 and a "Quantity" field 808. The "Action" field 806 can include selectable options for transacting one or more tradeable objects associated with the identifier stated in the object identifier field 802. The selectable options can be based on whether the account for the user of the electronic device is associated with tradeable objects identified by the object identifier field 802. For example, the electronic device may provide a "sell" option for the "Action" field 806 after verifying that the account for the user owns or holds one or more units of the tradeable object (e.g., FB stock) identified by the object identifier field 802 (e.g., stock ticker symbol "FB"). The electronic device may determine whether the account owns or holds one or more units of the tradeable object using operations such as those provided in the example method 500 provided in FIG. 5.

In the present example, when the electronic device determines that the account for the user does not own or does not hold units of the tradeable object, the electronic device can provide the user interface 800 and can restrict the selectable options available for the "Action" field 806 to a buy/acquire transaction action. In some examples, the default selectable option for the "Action" field 806 may be a "buy" or acquire option, where a "sell" or divest option is made available upon the electronic device determining that the account associated with a data record 114 (FIG. 1) for the user owns or holds one or more units of the tradeable object.

Further, the example "Quantity" field 808 can include a quantity value that is a user-defined quantity associated with the account associated with the user of the electronic device 160. The quantity value can be an auto-populated value and can be reflective of user preferences for tradeable object transactions. For example, when the electronic device receives a command to set an alert condition associated with the tradeable object identifier, the user of the electronic device can provide a user-defined quantity that may be stored at the electronic device or at the first server 110 in a data record 114 (FIG. 1). The user-defined quantity may be auto-populated on the user interface 800 (e.g., first application interface) upon such time that the alert condition is satisfied and the first selectable option is selected as described herein. For example, when: (a) the "FB price rises above 180.85 with a trade of 180.88"; and (b) the electronic device receives a signal representing selection of the first selectable option 712 (e.g., "Trade" in FIG. 7), the user interface 800 may auto-populate 10 units of the tradeable option for buy or sell. It will be appreciated that auto-populating user interface fields can minimize the time delay incurred between the time that the user decides to provide instructions for an action relating to the tradeable object and the time that the user is able to provide selections or inputs. Minimizing these time delays can increase the likelihood that the user's intention to acquire or divest tradeable options becomes obsolete (e.g., the tradeable object is no longer available for acquisition or is no longer desirable by the exchange community for purchase.

Referring again to FIG. 7, the second selectable option 714 is associated with a second application interface (not illustrated) that is different than the first application interface (e.g., a user interface 800 of FIG. 8) associated with the first selectable option 712. In the examples described herein, the first application interface is for promulgating a transaction based on the tradeable object identifier, and the second application interface is for displaying a resource status associated with the tradeable object identifier. As described above, the second selectable option 714 can be a selectable option labeled "Quote".

Figure 9:
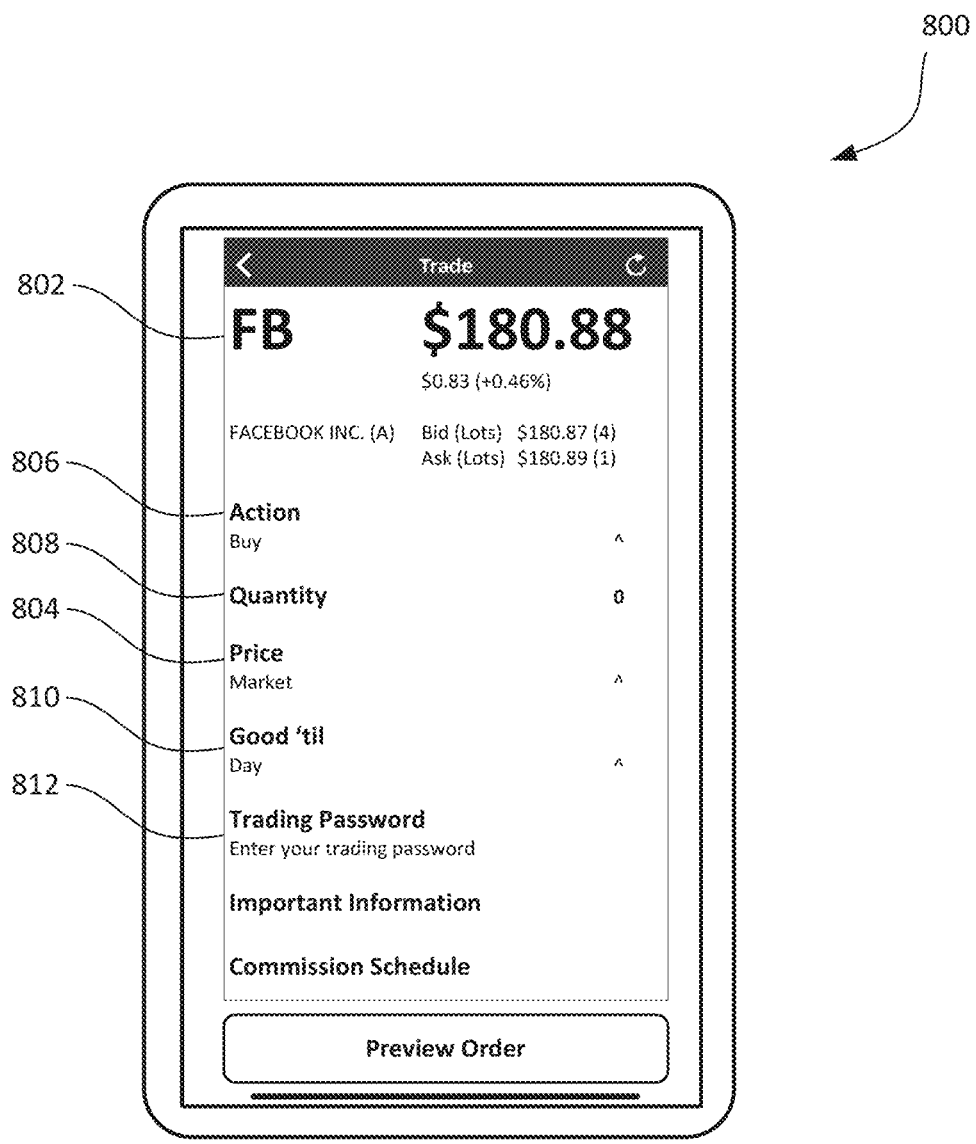
FIG. 9 illustrates a variant of the user interface of FIG. 8.

Reference is made to FIG. 9, which diagrammatically illustrates a variant of the electronic device user interface 800 of FIG. 8. As described, in some examples, the user interface 800 of FIG. 8 can be the displayed first application interface described herein at operation 350 of FIG. 3. In FIG. 9, the user interface 800 has been scrolled to reveal additional fields, such as the "Good 'til" field 810 and "Trading Password" field 812. The "Good 'til" field 810 can receive user input relating to when the buy or sell action instructions are valid until. The "Trading Password" field 812 can receive user input for a trading password associated with the account associated with the user and associated with a data record 114 stored at the first server 110 (FIG. 1).

In some examples, the notification application 162 (FIG. 1) stored and executed on the electronic device 160 includes an authenticated application interface configured to perform user authentication after a duration of inactivity time exceeds a timeout threshold. For example, subsequent to the user providing a trading password in the "Trading Password" field 812, the electronic device can activate an inactivity timer for determining when the notification application 162 may be idle. Because acquiring or divesting tradeable objects can impact a user's resources, it may be desirable to provide the authenticated application interface to minimize the risk that an unauthorized user not associated with an account for tradeable objects provides instructions for promulgating tradable object transactions.

In some examples, the electronic device determines whether the first application interface, such as the user interface 800 illustrated in FIG. 8, is operating as an authenticated session. An authenticated session can be an active state of the user interface 800 for a fixed duration of time following a correct input of a user password, such as a "trading password". The authenticated session is, for example, a time-limited session that becomes an unauthenticated session after the fixed duration of time has elapsed. In another example, the authenticated session can become an unauthenticated session in response to receiving a lock or "end session" command from a user of the electronic device.

In response to determining that the first application interface is operating an unauthenticated session, the electronic device can display an authentication interface for accepting user authentication prior to displaying the first application user interface. That is, an unauthenticated session can include a first application interface that has been idle for more than a timeout threshold amount of time.

Figure 10:
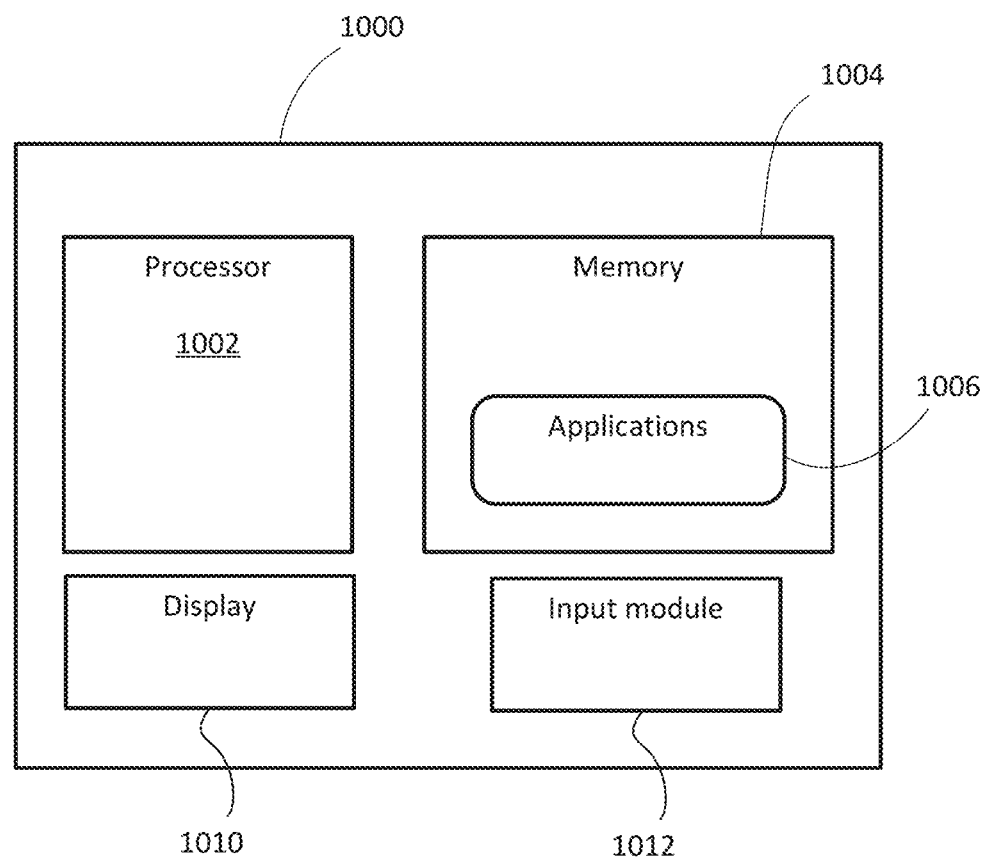
FIG. 10 illustrates, in simplified block diagram form, an electronic device, in accordance with an example of the present application.

Reference is made to FIG. 10, which illustrates, in simplified block diagram form, an electronic device 1000, in accordance with an example of the present application. The electronic device 1000 can be the electronic device 160 (FIG. 1). The electronic device 1000 includes one or more processors 1002, memory 1004, and a communications module for providing network communication capabilities with other computing devices. The memory 1004 can store processor-executable software applications 1006 that include an operating system to provide basic device functions. The software applications 1006 may also contain instructions implementing the operations and functions of the methods described herein.

The electronic device 1000 includes a display interface and/or a display 1010. The display 1010 can be any suitable display, such as a liquid crystal display (LCD), an e-ink/e-paper display, or the like. In some examples, the display 1010 is a touchscreen display. The electronic device 1000 includes an input module 1012 for receiving signals representing commands consistent with the examples described herein. For example, the electronic device 1000 can receive, via the input module 1012, a signal representing a command to set an alert condition (see e.g., operation 310 of FIG. 3). In some examples, the input module 1012 can be a touch input interface module of a touchscreen display, a push button input, a pointing device input, or other like device. In some examples, the combination of the display 1010 and the input module 1012 corresponds to the input/output module 164 described in FIG. 1.

In some examples, the electronic device 1000 is a portable electronic device, such as a smartphone, a personal computer, a personal digital assistant, a portable navigation device, a mobile phone, a wearable computing device (e.g., smart watch, wearable activity monitor, or the like), or any other type of computing device that may be configured to store data and software instructions, and execute software instructions to perform example operations described herein. The electronic device 1000 may be associated with one or more users which may interact with the electronic device 1000. For example, the user may operate the electronic device 1000 such as by way of a provided graphical user interface whereby the electronic device 1000 performs one or more operations consistent with the examples described herein.

Figure 11:
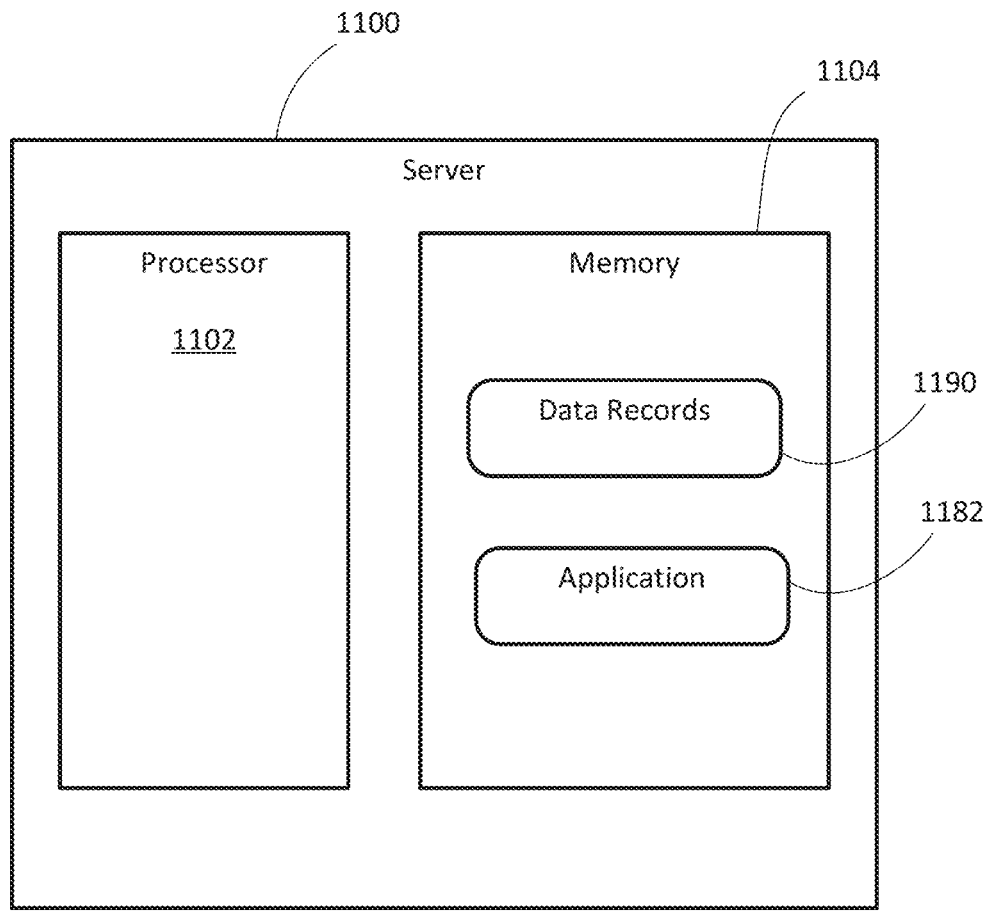
FIG. 11 illustrates, in simplified block diagram form, a server, in accordance with an example of the present application.

FIG. 11 illustrates, in simplified block diagram form, a server 1100, in accordance with an example of the present application. The server 1100 may be the first server 110 (FIG. 1) or the second server 120 (FIG. 1). The server 1100 includes one or more processors 1102, memory 1104 and a communications module for providing network communication capabilities with other computing devices. The memory 1104 may include data records 1190, which can be the data records 114 of FIG. 1 or the resource records 124 of FIG. 1. The memory can also include applications 1182 having instructions for implementing the operations and functions of the first server 110 or the second server, respectively or other computing devices described herein. For example, the applications 1182 can include the notification system 112 or the resource system 122 of FIG. 1.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computing device comprising:
a communications module;
an input module;
a display;
a processor coupled to the communications module, the display, and the input module; and
a memory coupled to the processor, the memory storing processor-executable instructions which, when executed, configure the processor to:
receive, via the input module, a first signal representing a command to set an alert condition associated with an identifier of a tradeable resource, the command to set the alert condition indicating a user-defined quantity associated with an account associated with the computing device, and, in response, generate the alert condition;
transmit, via the communications module, a second signal representing the alert condition to a monitoring system for setting up a targeted notification for the computing device;
receive, via the communications module, a third signal representing an asserted alert indicating that the alert condition is satisfied;
determine whether the tradeable resource is held by the account associated with the computing device; and
display on the display, based on the third signal representing the asserted alert and retrieving the user-defined quantity associated with the account, an alert notification providing access to buy and sell the tradeable resource if it is determined that the tradeable resource is held by the account and providing access to a buy option but not a sell option if it is determined that the tradeable resource is not held by the account, the alert notification including a field auto-populated with the user-defined quantity.

2. The computing device of claim 1, wherein the processor-executable instructions which configure the processor to determine whether the tradeable resource is held by the account associated with the computing device, further configure the processor to:
transmit, to the monitoring system, a fourth signal representing a tradeable resource query based on the identifier; and
receive, in response to the tradeable resource query, a fifth signal representing tradeable resource data that includes an indication of whether the tradeable resource is held by the account associated with the computing device.

3. The computing device of claim 2, wherein the tradeable resource data includes a quantity of the tradeable resource that is held by the account.

4. The computing device of claim 1, wherein the alert notification includes the identifier and a first selectable option associated with a first application interface; and wherein the processor-executable instructions, when executed, further configure the processor to:
in response to receiving, via the input module, a sixth signal representing selection of the first selectable option of the alert notification, display on the display the first application interface and provide the first application interface with a sell option if it is determined that the tradeable resource is held by the account and provide the first application interface without a sell option if it is determined that the tradeable resource is not held by the account.

5. The computing device of claim 4, wherein the processor-executable instructions, when executed, further configure the processor to auto-populate a further field of the first application interface with information for promulgating a transaction based on the identifier.

6. The computing device of claim 4, wherein the alert notification further includes a second selectable option associated with a second application interface that is different than the first application interface, and wherein the first application interface is for promulgating a transaction based on the identifier, and wherein the second application interface is for displaying a resource status associated with the identifier.

7. The computing device of claim 4, wherein the first application interface includes an authenticated application interface configured to perform user authentication after a duration of inactivity time exceeds a timeout threshold, and wherein the processor-executable instructions, when executed, further configure the processor to:
determine whether the first application interface is operating an authenticated session; and
in response to determining that the first application interface is operating an unauthenticated session, display on the display an authentication interface for accepting user authentication prior to displaying the first application interface, wherein the first application interface is displayed until the duration of inactivity time exceeds the timeout threshold.

8. The computing device of claim 1, wherein the alert condition includes at least one of a time period or a threshold.

9. The computing device of claim 1, wherein the identifier is associated with at least one of a bond, a stock, or a mutual fund.

10. A method of providing alert notifications on a computing device, the method comprising:
receiving, via an input module on the computing device, a first signal representing a command to set an alert condition associated with an identifier of a tradeable resource, the command to set the alert condition indicating a user-defined quantity associated with an account associated with the computing device, and, in response, generating the alert condition;
transmitting, via a communications module, a second signal representing the alert condition to a monitoring system for setting up a targeted notification for the computing device;
receiving, via the communications module, a third signal representing an asserted alert indicating that the alert condition is satisfied;
determining whether the tradeable resource is held by the account associated with the computing device; and
displaying on a display, based on the third signal representing the asserted alert and retrieving the user-defined quantity associated with the account, an alert notification providing access to buy and sell the tradeable resource if it is determined that the tradeable resource is held by the account and providing access to a buy option but not a sell option if it is determined that the tradeable resource is not held by the account, the alert notification including a field auto-populated with the user-defined quantity.

11. The method of claim 10, wherein determining whether the tradeable resource is held by the account associated with the computing device comprises:
transmitting, to the monitoring system, a fourth signal representing a tradeable resource query based on the identifier; and
receiving, in response to the tradeable resource query, a fifth signal representing tradeable resource data that includes an indication of whether the tradeable resource is held by the account associated with the computing device.

12. The method of claim 11, wherein the tradeable resource data includes a quantity of the tradeable resource that is held by the account.

13. The method of claim 10, wherein the alert notification includes the identifier and a first selectable option associated with a first application interface, and wherein the method further comprises:
in response to receiving, via the input module, a sixth signal representing selection of the first selectable option of the alert notification, displaying on the display the first application interface and providing the first application interface with a sell option if it is determined that the tradeable resource is held by the account and providing the first application interface without a sell option if it is determined that the tradeable resource is not held by the account.

14. The method of claim 13, further comprising auto-populating a further field of the first application interface with information for promulgating a transaction based on the identifier.

15. The method of claim 13, wherein the alert notification further includes a second selectable option associated with a second application interface that is different than the first application interface, and wherein the first application interface is for promulgating a transaction based on the identifier, and wherein the second application interface is for displaying a resource status associated with the identifier.

16. The method of claim 13, wherein the first application interface includes an authenticated application interface configured to perform user authentication after a duration of inactivity time exceeds a timeout threshold,
and wherein the method further comprises:
determining whether the first application interface is operating an authenticated session; and
in response to determining that the first application interface is operating an unauthenticated session, displaying on the display an authentication interface for accepting user authentication prior to displaying the first application interface, wherein the first application interface is displayed until the duration of inactivity time exceeds the timeout threshold.

17. The method of claim 10, wherein the alert condition includes at least one of a time period or a threshold.

18. A non-transitory computer-readable storage medium storing instructions for providing alert notifications on a computing device, the instructions, when executed by a processor of a computer system, cause the computer system to:
receive, via an input module, a first signal representing a command to set an alert condition associated with an identifier of a tradeable resource, the command to set the alert condition indicating a user-defined quantity associated with an account associated with the computing device, and, in response, generate the alert condition;
transmit, via a communication module, a second signal representing the alert condition to a monitoring system for setting up a targeted notification for the computing device;
receive, via the communications module, a third signal representing an asserted alert indicating that the alert condition is satisfied;
determine whether the tradeable resource is held by the account associated with the computing device; and
display on a display, based on the third signal representing the asserted alert and retrieving the user-defined quantity associated with the account, an alert notification providing access to buy and sell the tradeable resource if it is determined that the tradeable resource is held by the account and providing access to a buy option but not a sell option if it is determined that the tradeable resource is not held by the account, the alert notification including a field auto-populated with the user-defined quantity.

* * * * *